United States Patent [19]

Kagiyama et al.

[11] Patent Number: 5,065,642
[45] Date of Patent: Nov. 19, 1991

[54] APPARATUS FOR ABSORBING TORQUE VARIATION

[75] Inventors: Junji Kagiyama, Kariya; Kiyonori Kobayashi, Chiryu; Mototaka Nakane, Toyota; Masakazu Kamiya, Toyoake; Mitsuhiro Umeyama, Toyota; Masaki Inui, Toyota; Kaoru Wakahara, Toyota; Masaki Hosono, Toyota, all of Japan

[73] Assignees: Aisin Seiki Kabushiki Kaisha Kariya; Toyota Jidosha Kabushiki Kaisha, Toyoto, both of Kariya, Japan

[21] Appl. No.: 485,558

[22] Filed: Feb. 27, 1990

[30] Foreign Application Priority Data

Feb. 28, 1989 [JP] Japan ............................... 1-23279[U]
Oct. 19, 1989 [JP] Japan ............................. 1-122637[U]

[51] Int. Cl.⁵ ............................................. F16F 15/12
[52] U.S. Cl. .................................. 74/574; 192/106.2; 464/68
[58] Field of Search ............ 74/574; 192/106.1, 106.2; 464/68, 64

[56] References Cited

U.S. PATENT DOCUMENTS

| | | | |
|---|---|---|---|
| 4,351,168 | 9/1982 | Prince et al. ................ | 192/106.1 X |
| 4,663,983 | 5/1987 | Kobayashi et al. ........... | 192/106.2 X |
| 4,747,801 | 5/1988 | Chasseguet et al. ........... | 74/574 X |
| 4,748,868 | 6/1988 | Kobayashi et al. ............ | 74/574 |
| 4,820,239 | 4/1989 | Despres et al. .............. | 74/574 X |
| 4,857,032 | 8/1989 | Aiki et al. .................. | 74/574 X |
| 4,899,617 | 2/1990 | Kobayashi et al. ............ | 74/574 |
| 4,904,226 | 2/1990 | Chassequet et al. .......... | 74/574 X |

FOREIGN PATENT DOCUMENTS

| | | | |
|---|---|---|---|
| 55-20930 | 2/1980 | Japan . | |
| 0200816 | 11/1984 | Japan ............... | 192/106.2 |
| 0042174 | 10/1987 | Japan ............... | 192/106.2 |
| 63-42950 | 3/1988 | Japan . | |
| 63-129748 | 8/1988 | Japan . | |
| 64-55339 | 4/1989 | Japan . | |
| 194643 | 6/1989 | Japan . | |

Primary Examiner—Allan D. Herrmann
Assistant Examiner—Winnie Yip
Attorney, Agent, or Firm—Burns, Doane, Swecker & Mathis

[57] ABSTRACT

An apparatus for absorbing torque vibration comprises inertial bodies comprising first and second flywheels, and a damper mechanism, torque limiting mechanism and hysteresis mechanism interposed between the first and second flywheels.

The rotation is transmitted between both flywheels via damper mechanism, torque limiting mechanism and hysteresis mechanism. Resilient members are secured to spring seats, which are engaged with both ends of a spring of the damper mechanism, at an inner-half portion of the spring seat closer to the axis of said flywheels than an axial line of the spring. Excess compression of the resilient members is prevented.

23 Claims, 4 Drawing Sheets ns, while suppressing abnormal wear of the resilient members affixed to the spring seat of the damper mechanism.

According to a first aspect of the present invention, there is provided a technical means devised in order to solve the above-described problem, which solution includes affixing resilient members to spring seats, which are engaged with both ends of a spring constituting a damper mechanism of a torque vibration absorbing apparatus, the resilient members being affixed at an inner-half portion of the spring seat closer to the axis of the flywheels than an axial line of the spring.

According to the first aspect, there is provided an apparatus for absorbing torque vibration comprising:

a first inertial body comprising a first flywheel adapted to be connected to a driving source, a second inertial body comprising a second flywheel disposed coaxial with the first flywheel, and a damper mechanism, torque limiting mechanism and hysteresis mechanism interposed between said first and second flywheels, said damper mechanism comprising spring seats which are engaged with both ends of a spring of said damper mechanism, rotation of said driving source being transmitted between both the flywheels via said damper mechanism, said torque limiting mechanism and said hysteresis mechanism, wherein an improvement resides in the disposition of resilient members at an inner-half portion on a plurality of end faces of spring seats which faces come to abut with a corresponding abutting portion of the first or second inertial body, said inner-half portion of the spring seats being disposed closer to an axis of said flywheels than an axial line of said spring.

With the apparatus for absorbing torque vibration thus constructed, the resilient members are disposed on the inner-half portion of the spring seat. Therefore, where the apparatus is rotating at high speed, engagement with the arm portion of the driven disk can take place at the outer circumferential side of the spring plate where resilient members are not secured, since the resilient members are affixed only to the inner circumferential side of the spring seat of the damper mechanism.

In addition, though abutting contact between the spring seat and the arm portion of the driven disk takes place initially at protruding portions, the occurrence of a knocking noise can be prevented by affixing the resilient members to the protruding portions. Since the outer circumferential side of the spring seat and the arm portion of the driven disk are engaged without the intervention of the resilient members, the spring seat can be positioned accurately and torque can be transmitted efficiently.

Furthermore, the quantity of the resilient members affixed to the spring seat can be reduced in comparison with the prior art. This contributes greatly to a reduction in manufacturing cost.

According to a second aspect of the present invention, there is provided an apparatus for absorbing torque vibration comprising:

a first inertial body comprising a first flywheel adapted to be connected to a driving source, a second inertial body comprising a second flywheel disposed coaxial with the first flywheel, and

APPARATUS FOR ABSORBING TORQUE VARIATION

FIELD OF THE INVENTION

This invention relates to an apparatus for absorbing torque vibration, which apparatus is utilized in an automobile, industrial vehicle, ship or the like and is disposed in a power transmission system.

BACKGROUND OF THE INVENTION

Description of the Related Art

Prior disclosure relating to the present invention have been filed by one of the assignees of the present applications Japanese Utility Model Application No. 62-150087 (now Japanese Utility Model Kokai Publication No. 64-55339, laid-open on Apr. 5, 1989, which corresponds to the U.S. Pat. No. 4,899,617 filed on Sept. 30, 1988). According to this prior application, resilient members for preventing the generation of a knocking noise are provided over the entire surface of a spring seat in an apparatus for absorbing torque vibration having a similar construction to that of the present invention.

The object of the previous application is an arrangement such that the spring seat will not directly contact driving and driven disks when an engine, which is the driving source, is started and stopped, thereby preventing the generation of a knocking noise even if the torque vibration between the seat and each of the disks is large. The problem to be solved by the invention is as follows:

With the shock absorbing means illustrated in the related invention, the spring seat does not directly contact the driving and driven plates when the rotational speed of the engine is in a resonant rotational speed region of the torque vibration absorbing apparatus (i.e., when the engine is started and stopped), thereby preventing the occurrence of abnormal sounds in the torque vibration absorbing apparatus.

In a case where a large torque is applied to the torque vibration absorbing apparatus in the prior application described above, a large compressive force is conferred upon the resilient members interposed between the spring seat and the plates. Since the compressive force is large, there is the possibility that the resilient members will be damaged or sustain abnormal wear. In a case where the torque vibration absorbing apparatus rotates at high speed, contact occurs mainly at the outer peripheral side of the spring seats when the spring and the spring seats of the damper mechanism contact the arm portion of the driven disk. At this time, knocking noise is reduced owing to deformation of the resilient members affixed to the entire surface of the spring seat, but an offset, which is equivalent to the amount of deformation of the resilient members, occurs at the engagement between the spring seat and the arm portion of the driven disk, and therefore the spring flexes in a state tilted with respect to the central axis of the spring. As a result, the spring contacts the flywheels. Owing to this sliding resistance, the spring cannot deliver a sufficient restraining force and the possibility arises that vibration will not be sufficiently absorbed.

SUMMARY OF THE DISCLOSURE

The present invention has as an object solving the problem of the prior art by holding the spring of the damper mechanism in the optimum state and effectively providing absorption of vibration regardless of the operating state of the torque vibration absorbing apparaa damper mechanism, torque limiting mechanism and hysteresis mechanism interposed between said first and second flywheels, rotation of said driving source being transmitted between both the flywheels via said damper mechanism, said torque limiting mechanism and said hysteresis mechanism, wherein improvement resides in securing resilient members to spring seats, which are engaged with both ends of a spring of said damper mechanism, at least one of the resilient members being embedded within the spring seats on at least a face thereof directed to abut to either the first inertial body or the second inertial body so as to project out of the spring seat.

The spring seat can be positioned accurately and the knocking noise can be prevented as the abutting contact initially takes places at protruding portions provided with resilient members, particularly, formed as a projecting portion. Further, excessive compression of the resilient members can be prevented.

DETAILED DESCRIPTION OF THE PREFERRED EMBODIMENTS

An embodiment employing the technical means of the present invention will now be described with reference to the drawings.

Figure 1:
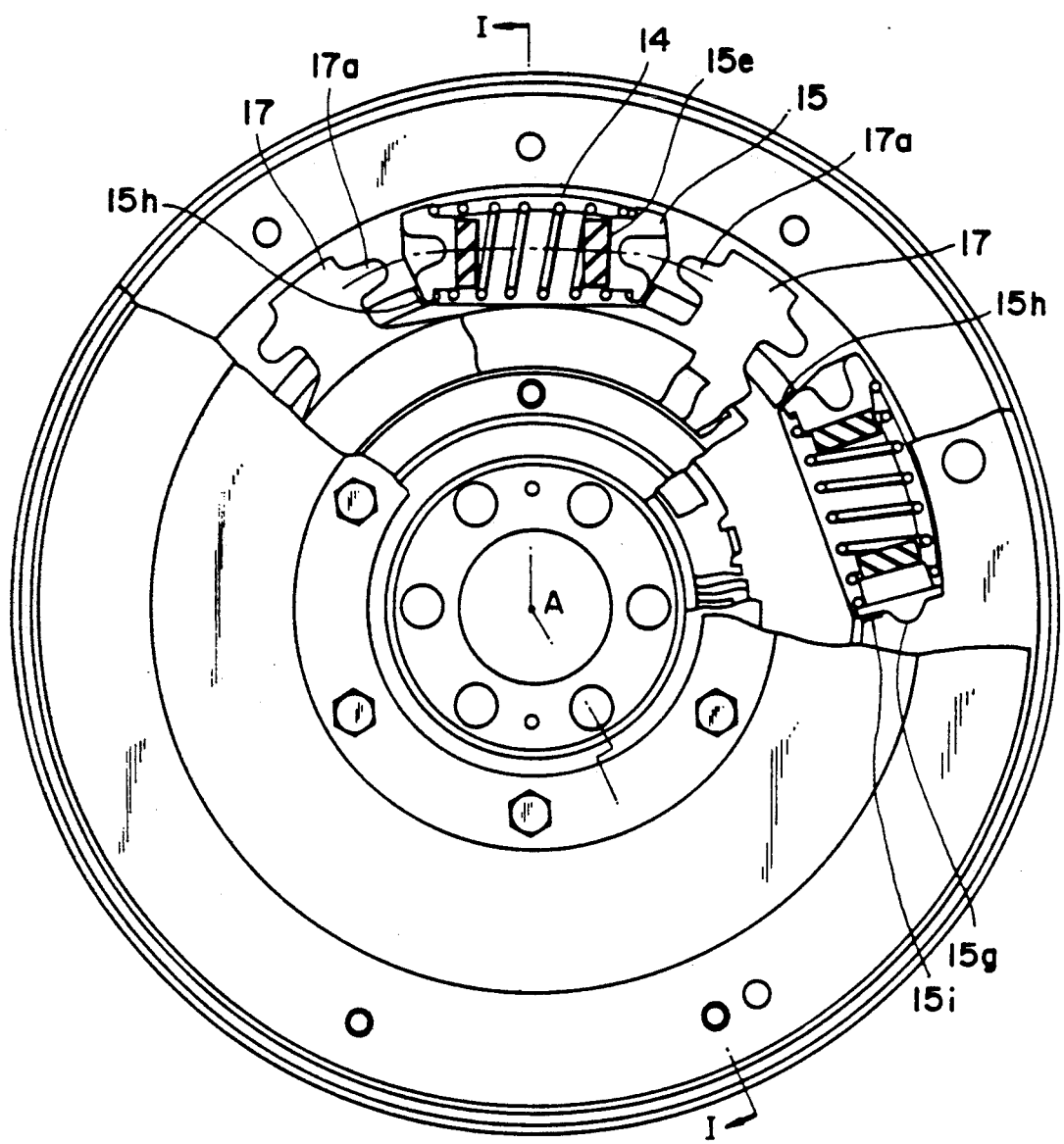
FIG. 1 is a partially broken-away front view showing an apparatus for absorbing torque vibration in accordance with the present invention.
Figure 2:
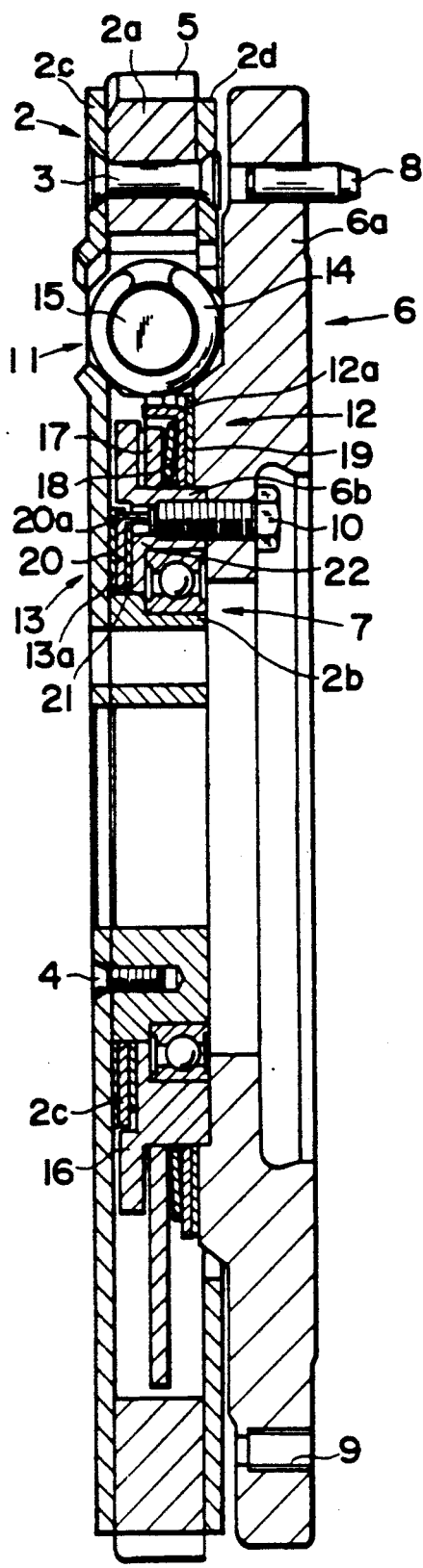
FIG. 2 is a sectional view taken along line I—I of FIG. 1.

FIG. 1 is it front view showing the torque vibration absorbing apparatus in a partially broken away form, and FIG. 2 is a sectional view taken along line I—I of FIG. 1.

In FIGS. 1 and 2, ring-shaped first flywheels 2a and 2b forming an inertial body on the driving side are embraced by driving plates 2c, 2d formed of steel plates and similarly forming the inertial body 2 on the driving side. The first flywheels are united by a rivet 3 and screw 4. The inertial body 2 on the driving side is secured to a drive shaft (not shown) connected to a driving source by bolt means and corotates with the drive shaft. A ring gear 5 for a starter is formed on the outer circumferential portion of the first flywheel 2a.

A second flywheel 6a and a driven plate 6b forming an inertial body 6 on the driven side are disposed coaxially with the inertial body 2 on the driving side and in parallel therewith. The inertial body 2 on the driving side and the inertial body 6 on the driven side are supported so as to be rotatable relative to each other via a bearing 7. A pin 8 for positioning with a clutch mechanism (not shown) is inserted into the second flywheel 6a, and the second flywheel 6a is formed to have a screw hole 9 for securing a clutch cover (not shown) which accommodates the clutch mechanism. The inertial body 6 on the driven side is composed of two sections, as mentioned above, and the second flywheel 6a and driven plate 6b are united by a bolt 10.

A damper mechanism 11, torque limiting mechanism 12 and hysteresis mechanism 13 are interposed between the inertial body 2 on the driving side and the inertial body 6 on the driven side.

The damper mechanism 11 comprises a coil spring 14, spring seats 15 provided on both ends of the coil spring 14, and a resilient member 15e affixed to the spring seats 15 and residing within the coil spring 14. The damper mechanism is positioned in flywheel 2a in a cut-away portion thereof.

The torque limiting mechanism 12 is interposed between the second flywheel 6a and the driven plate 6b. A cut-away portion 16 for accommodating the torque limiting mechanism 12 is formed in the edge portion of the ring-shaped driven plate 6b. The torque limiting mechanism 12 comprises a friction lining 12a, driven disk 17, conical spring 18, control member 19 and friction lining 12a are disposed in the order mentioned in the cut-away portion 16 from the driven plate 6b to the second flywheel 6a. The torque limiting mechanism 12 is adapted in such a manner that torque vibration is damped owing to sliding frictional loss produced by a biasing force which the conical spring 18 applies to the friction linings 12a, 12a. A pressing force acting upon the second flywheel 6a and driven plate 6b constituting the driven-side inertial body 2 of the driven disk 17 is exerted by the conical spring 18. In a case where the rotational torque is less than a frictional force exerted by this pressing force, the driven disk 17 and the flywheels 2 and 6 on the driving and driven sides corotate. When the torque exceeds the frictional force, the driven disk 17 and the inertial body 6 on the driven side slide relative to each other so that transmission of torque exceeding the frictional force is interrupted.

The hysteresis mechanism 13 is accommodated between the driven plate 6b of the inertial body 6 on the driven side and the side plate 2c of the inertial body on the driving side. The hysteresis mechanism 13 comprises a friction lining 13a, a control member 20 and a conical spring 21 in the order mentioned from the driving plate 2c to the driven plate 6b. A portion of the control member 20 of the hysteresis mechanism 13 is bent to form a bent portion 20a, which is engaged with a hole 22 formed in the driven plate 6b. The bent portion 20a of the control member 20 rotates in the hole 22 of the driven plate 6b. After performing a predetermined amount of rotation, the bent portion 20a has its rotation limited by a wall portion of the driven plate 6b and is fixed in the circumferential direction. Sliding frictional force of the friction lining 13a pressed against the driving plate 2c by the conical spring 21 applies a hysteresis characteristic.

Figure 3:
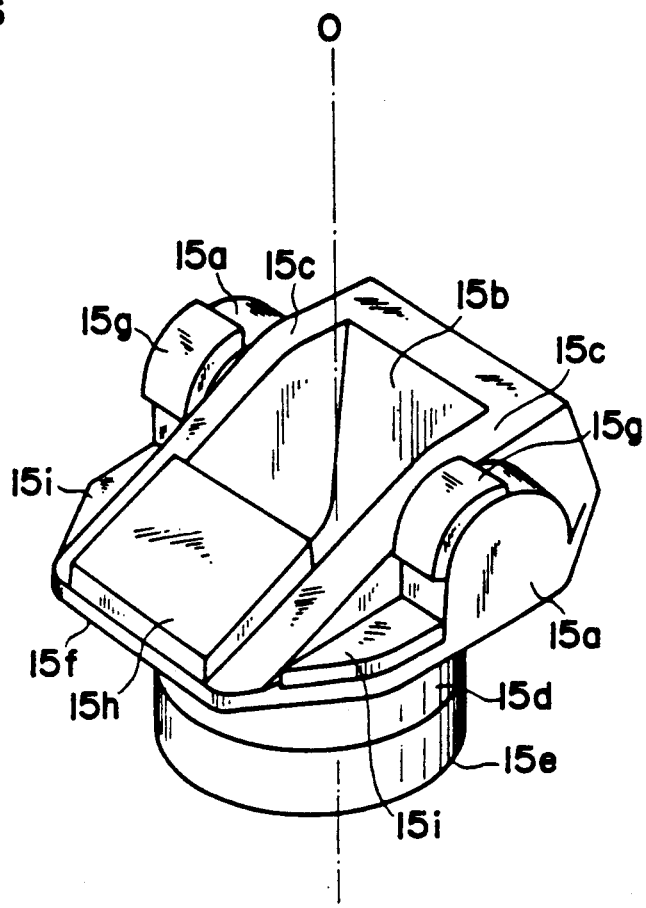
FIG. 3 is a perspective view of a spring seat constituting a damper mechanism.

FIG. 3 is a perspective view illustrating the spring seat 15, which is one member constituting the damper mechanism 11.

The spring seat 15 is formed to have protuberances 15a, which define projections in the direction toward the first flywheel 2a, substantially at the diameter portion of the coil spring 14 where it abuts against the first flywheel 2a of the inertial body 2 on the driving side. The central portion of the spring seat 15 is formed to have a recess 15b which engages an arm portion 17a of the driven disk 17 on the driven side. At rib 15c is formed between the protuberance 15a and the recess 15b and defines the side wall of the recess 15b. A generally columnar projection 15d is formed on the spring seat 15 on the side opposite the recess 15b. A resilient member 15e, which has the same shape as that of the projection 15d and is deformed at a spring constant larger than that of the coil spring 14, is affixed to the projection 15d. The pair of spring seats 15 disposed at both ends of the coil spring 14 are arranged at the ends of the coil spring 14 with their projections 15d facing each other and function as members for seating the coil spring 14. When the spring seat 15 is installed in the damper mechanism 11, one end face 15f of the spring seat 15 is disposed so as to be directed radially inward of the torque vibration absorbing apparatus. Resilient members 15g, 15h, 15i are affixed to the side of the end face 15f. At least one of the resilient members is embedded in a retracted space upon movement of the spring so as to define a receiving space for receiving a deformed portion of the resilient members.

The operation of the embodiment according to the present invention will now be described.

Rotational torque transmitted from the driving source is transmitted to the driving-side inertial body 2 which corotates with a crankshaft. The rotational torque is transmitted to the driven-side inertial body 6 via the damper mechanism 11, torque limiting mechanism 12 and hysteresis mechanism 13. At this time, a slight fluctuation in the rotational torque of the crankshaft and engine vibration are absorbed by an oscillatory system comprising the driving side inertial body 2 and driven side inertial body 6 connected via the coil spring 14 of the damper mechanism 11, the torque limiting mechanism 12 and the damping effect of the hysteresis mechanism 13.

Figure 4:
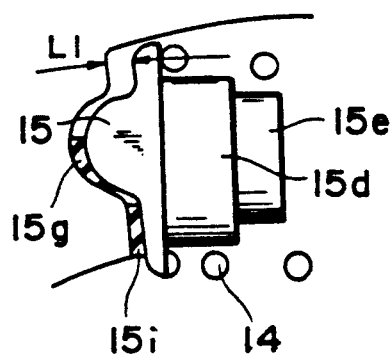
FIG. 4 is an explanatory view illustrating the operating state when a torque acting upon the damper mechanism is small, or in a case where rotational speed is low.

When the load from the driving source is small, a gap L1 is formed between the driving plates 2c, 2d and the outer half portion of the spring seat 15 between which the damper mechanism 11 is interposed, as shown in FIG. 4. However, the driving plates 2c, 2d on the inner-half portion of the spring seat 15 and the spring seat abuttingly engage. Knocking noise at the time when the two abut at the engaging portion of the inner-half portion of the spring seat 15 is absorbed by shock absorbing members such as the resilient members 15g, 15i etc. fixed to the spring seat 15 and intervening at the abutting portions.

Figure 5:
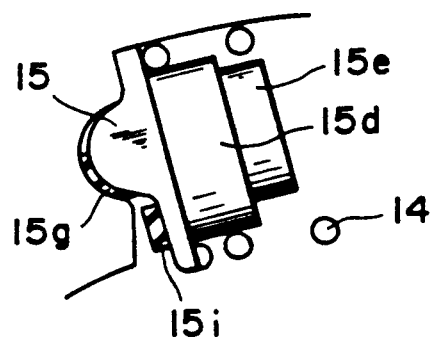
FIG. 5 is an explanatory view illustrating the operating state when a torque acting upon the damper mechanism is large, or in a case where rotational speed is high.

When the load from the driving source is large, the driving plates 2c, 2d and the spring seat 15 abuttingly engage, as shown in FIG. 5. The driving plates 2c, 2d and the spring seat abuttingly engage only at the protuberance 15a. Furthermore, since the outer circumferential side of the spring seat 15 and the arm portion 17a of the drivgn disk 17 engage without the intervention of the resilient members, the spring seat 15 can be positioned accurately, a sufficient torque can be obtained, and knocking noise between the abutting members is absorbed by the resilient member 15g.

At operation during high-speed rotation, a centrifugal force acts upon the damper mechanism 11 so that a force directed radially outward of the torque vibration absorbing apparatus acts upon the damper mechanism 11. Even in a state near the maximum allowable rotational speed of the torque vibration absorbing apparatus, the spring seat 15 of the damper mechanism will not engage the arm portion 17a of the driven disk 17 in a state deviated to one side. Accordingly, the coil spring 14 of the damper mechanism 11 also will not deviate and flex in the radially inward or outward direction. Furthermore, resilient members do not intervene between the outer circumferential side of the spring seat 15 and the arm portion 17a of the driven disk 17, and the rigid bodies engage with each other. As a result, engagement in a state deviated to one side does not occur. In other words, in accordance with the present invention, the damper mechanism 11 is held in the correct states and impediments to the absorption of vibration are eliminated.

Figure 6:
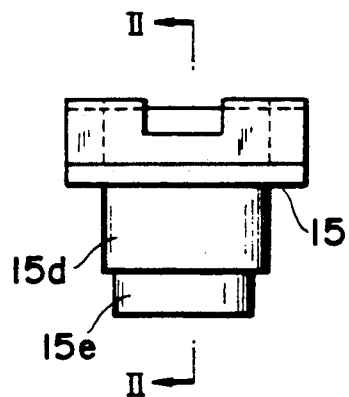
FIG. 6 is a front view showing a second embodiment of a spring seat.
Figure 7:
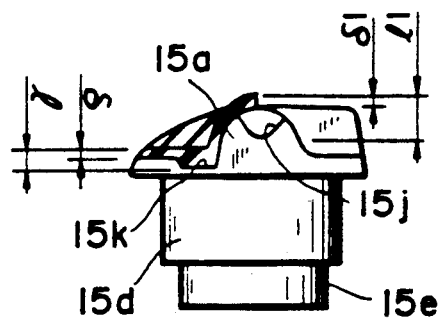
FIG. 7 is a side view of a second embodiment.
Figure 8:
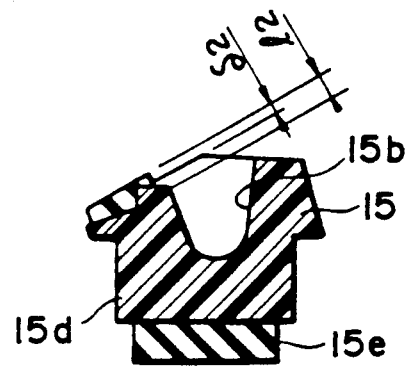
FIG. 8 is a sectional view taken along line II—II of FIG. 6.

FIGS. 6, 7 and 8 illustrate a second embodiment of the spring seat 15 according to the first aspect of the present invention.

This embodiment differs from the foregoing solely in that a notch 15j is formed in the protuberance 15a of the spring seat 15, and a notch 15k is formed in the abutting faces to the driving plates 2c, 2d. Other structural aspects are the same as in the foregoing embodiment.

In the second embodiment, a resilient material is formed integral with the abutting portions to the driven disk 17 and driving plates 2c, 2d on the inner-half portion of the spring seat 15. Both of the notches 15j, 15k are filled with the resilient material. According to this embodiment, excessive compression of the resilient members is prevented by limiting maximum flexure to $\delta$, $\delta_1$, $\delta_2$, with respect to resilient member thicknesses 1, $1_1$, $1_2$. This makes it possible to improve durability.

Figure 9:
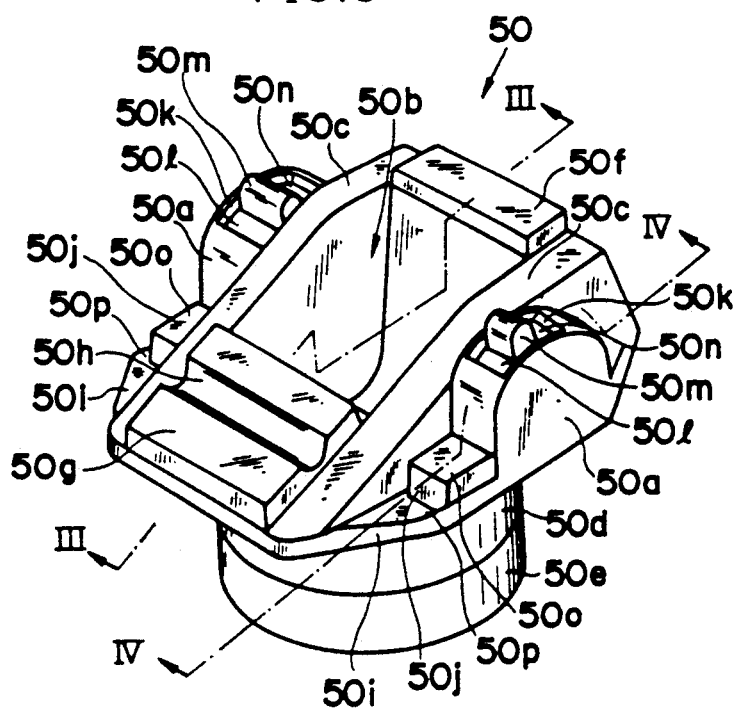
FIG. 9 is a perspective view of a spring seat according to a third embodiment of the present invention.
Figure 10:
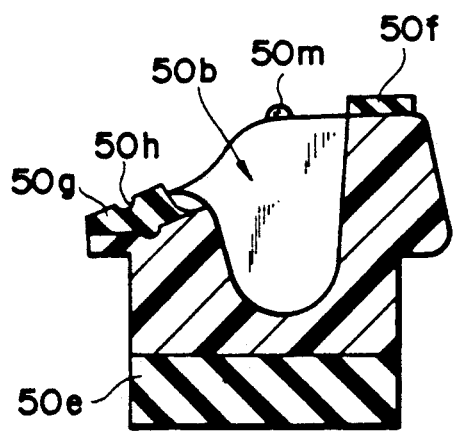
FIG. 10 is a sectional view taken along line III—III of FIG. 9.
Figure 11:
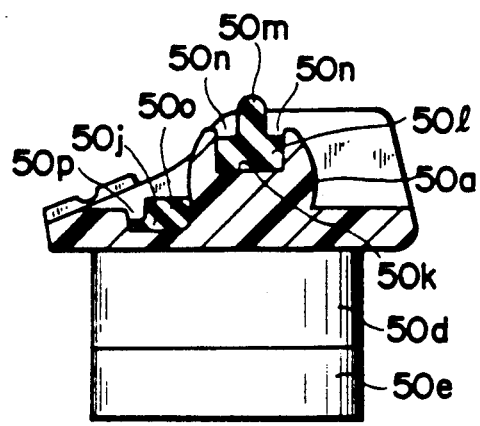
FIG. 11 is a sectional view taken along line IV—IV of FIG. 9.

FIGS. 9 through 11 illustrate a third embodiment of the spring seat according to the second aspect of the present invention.

FIG. 9 is a perspective view of a spring seat 50, FIG. 10 a sectional view taken along line III—III of FIG. 9, and FIG. 11 a sectional view taken along line IV—IV of FIG. 9. The spring seat 50 is formed to have protuberance 50a, 50a which protrude toward the first flywheel 2a. The central portion of the spring seat 50 is formed to have a recess 50b engaged by the arm portion 17a of the driven disk 17. Ribs 50c are provided between the projections 50a, 50a and the recess 50b, thereby forming side wall portions of the recess 50b. A substantially columnar-shaped projection 50d is formed on the side opposite the recess 50b. A columnar resilient member 50e is affixed to the projection 50d. The resilient member 50e is formed of a resilient body which deforms at a spring constant greater than that of the coil spring 14 of damper mechanism 11. The ribs 50c of the spring seat 50 are each formed to have an inclined surface. Seat-shaped resilient members 50f, 50g are affixed to the spring seat 50 on both ends of the opening of the spring seat 50 in the longitudinal direction thereof so as to extend along the inclined surfaces. The resilient member 50g is formed to have a groove 50h extending in the longitudinal direction of the resilient member 50g. Flanges 50i are formed toward the inclined end of the ribs 50c adjacent the protuberances 50a formed on the spring seat 50. A resilient member 50j is affixed also to each of the flanges 50i. Furthermore, the distal end of each protuberance 50a is formed to have a groove 50k, in which resilient member 50l is fitted. The resilient member 50l has a projecting portion 50m projecting from the protuberance 50a. The surfaces of the resilient member 50l, which is fitted in the groove 50k of the protuberance 50a, and the protuberance 50a define a step shape in which a gap 50n is set. The gap 50n is set to have an amount of clearance sufficient to accommodate the resilient member 50l deformed at deformation of the projecting portion 50m of the resilient member 50l when the arm portion 17a of the driven plate 17 mates with the gap 50n. A similar projecting portion 50o is provided also on the resilient member 50j affixed to the flange portion 50i so that a gap 50p is set between the flange portion 50i and the resilient member 50j. When the two flywheels rotate relative to each other, the arm portion 17a of the driven disk 17 first starts to abut against the resilient members 50l, 50j, 50f and 50g of the spring seat, as a result of which knocking noise upon contact is prevented. At further relative rotation, the projecting portion 50m of the resilient member 50l is elastically deformed. When elastic deformation subsequently exceeds a predetermined amount, however, the arm portion 17a of the driven disk 17 and the metallic portion of the spring seat 50 come into contact, and therefore elastic deformation of the resilient member in excess of the predetermined amount is limited to protect the resilient member. In accordance with the third embodiment, the projecting portion 50m of the resilient member 50l is accommodated in the gap 50n also when the projecting portion is deformed, and therefore the resilient member is not excessively compressed by the metallic portions of the spring seat and driven disk 17. The resilient member thus is given further protection.

Similarly, when the resilient member 50j affixed to the flange portion 50i is elastically deformed, the deformed resilient member 50j is received in the gap 50p set between the resilient member and the flange portion 50i. As a result, excessive elastic deformation of the resilient member 50j is checked.

As described in the foregoing embodiments, resilient members serving as shock absorbers are either affixed to the inner-half portion of the spring seat constituting a damper mechanism or disposed adjacent to a space accommodating the deformed portion of resilient members, as in the torque vibration absorbing apparatus of the present invention. As a result, when torque vibration is absorbed by the damper mechanism, the coil spring is not caused to buckle and can be held in the correct attitude in all operating states, namely in the ordinary operating state, high-load operating state and high-rotation operating state.

Since excessive compression of the resilient members can be prevented, the amount of the resilient material affixed to the spring seat is adjusted by the resilient member fixing manner of the kind illustrated in the other embodiments of the invention, and stress commensurate with the operating state of the torque vibration absorbing apparatus can be made to act upon the resilient material.

It is understood that modifications in the art may be done without departing from the gist and scope of the present invention as disclosed herein and claimed hereinbelow.

We claim:

1. An apparatus for absorbing torque vibration comprising:
   a first inertial body comprising a first flywheel adapted to be connected to a driving source,
   a second inertial body comprising a second flywheel disposed coaxial with the first flywheel, and
   a damper mechanism, torque limiting mechanism and hysteresis mechanism interposed between said first and second flywheels, said damper mechanism comprising spring seats which are engaged with both ends of a spring of said damper mechanism,
   rotation of said driving source being transmitted between both the flywheels via said damper mechanism, said torque limiting mechanism and said hysteresis mechanism,
   wherein the improvement comprises resilient members disposed at only an inner-half portion on a plurality of end faces of the spring seats, which abut with a corresponding abutting portion of one of the first and second inertial bodies, said inner-half portion of the spring seats being disposed closer to an axis of said flywheels than an axial line of said spring.

2. The apparatus for absorbing torque vibration as defined in claim 1, in which the resilient members are disposed at said inner-half portion on a pair of protuberances, and an end face of the spring seat.

3. The apparatus for absorbing torque vibration as defined in claim 2, in which the resilient member is also disposed at said inner-half portion on an end face of the spring seat directed radially inwardly toward the axis of said flywheels.

4. The apparatus for absorbing torque vibration as defined in claim 3, in which the resilient member is further disposed at said inner-half portion on a pair of end faces of flanges of the spring seat, the flange extending from the protuberance to said end face directed radially inwardly toward the axis of said flywheels.

5. The apparatus for absorbing torque vibration as defined in claim 1, in which the resilient members are disposed in a cut-away portion which defines the maximum deformation.

6. The apparatus for absorbing torque vibration as defined in claim 1, in which the resilient members are disposed in a cut-away portion formed on the end face of the spring seat, which cut-away portion accommodates a deformed portion of the resilient members upon abutting with the inertial body.

7. The apparatus for absorbing torque vibration as defined in claim 1, in which at least one of said resilient members is disposed adjacent to a space which accommodates a deformed portion of the resilient member upon abutting with the inertial body.

8. The apparatus for absorbing torque vibration as defined in claim 7, in which the space is formed through configuration of the resilient members.

9. The apparatus for absorbing torque vibration as defined in claim 8, in which the configuration includes a groove formed on the resilient member.

10. The apparatus for absorbing torque vibration as defined in claim 9, in which any one of the resilient members is disposed in a groove formed on any one of the end faces of the spring seat.

11. The apparatus for absorbing torque vibration as defined in claim 8, in which the configuration includes a cut-away portion formed on the resilient member.

12. The apparatus for absorbing torque vibration as defined in claim 8, in which the configuration includes a recess formed on the resilient member.

13. An apparatus for absorbing torque vibration comprising:
   a first inertial body comprising a first flywheel adapted to be connected to a driving source, a second inertial body comprising a second flywheel disposed coaxial with the first flywheel, and a damper mechanism, torque limiting mechanism and hysteresis mechanism interposed between said first and second flywheels, rotation of said driving source being transmitted between both the flywheels via said damper mechanism, said torque limiting mechanism and said hysteresis mechanism, wherein the improvement comprises resilient members secured to spring seats engaged with both ends of a spring of said damper mechanism, at least one of the resilient members being embedded within one of said end faces of the spring seats so as to project from said face thereof directed to abut to one of the first inertial body and the second inertial body so as to project out of the spring seat.

14. The apparatus for absorbing torque vibration as defined in claim 13, wherein said at least one of the resilient members is embedded within a retracted space leaving a receiving space which accommodates a deformed portion of the resilient members upon abutting with the first inertial body or the second inertial body.

15. The apparatus for absorbing torque vibration as defined in claim 13 or 14, in which at least a pair of the resilient members is disposed in a recess formed on end faces of protuberances of the spring seat, the protuberances protruding in a circumferential direction toward the first inertial body so as to define a receiving space within the recess, the receiving space receives a deformed portion of the resilient member having a projecting portion projecting out of the recess.

16. The apparatus for absorbing torque vibration as defined in claim 14, in which the receiving space is further formed through configuration of the resilient members.

17. The apparatus for absorbing torque vibration as defined in claim 16, in which the configuration includes at least one selected from a group consisting of groove, cut-away portion and recess formed on the resilient member.

18. The apparatus for absorbing torque vibration as defined in claim 15, in which at least one of the resilient members on a spring seat end face directed radially inward of the apparatus, the resilient member having a groove which accommodates the deformed portion.

19. The apparatus for absorbing torque vibration as defined in claim 18, in which one of the resilient members is provided on a flange extending from one of the protuberances of the spring seat, the resilient member being disposed in a groove formed on the flange to leave the space which accommodates the deformed portion.

20. The apparatus for absorbing torque vibration as defined in claim 13, in which at least one of the resilient members on has a flange connecting the face of a protuberance of the spring seat, the resilient member being disposed in a groove formed on the flange to leave a space which accommodates the deformed portion.

21. The apparatus for absorbing torque vibration as defined in claim 13, in which resilient members on said spring seat end face having a groove as a receiving space.

22. The apparatus for absorbing torque vibration as defined in claim 13, in which the resilient members have a thickness which allows direct abutment between the inertial body and a spring seat portion not covered with the resilient members under application of a large torque.

23. The apparatus for absorbing torque vibration as defined in claim 22, in which one of the resilient members is provided on a radially outer said end face of the spring seat.

* * * * *

UNITED STATES PATENT AND TRADEMARK OFFICE
CERTIFICATE OF CORRECTION

PATENT NO. : 5,065,642
DATED : November 19, 1991
INVENTOR(S) : Junji KAGIYAMA, et al.

It is certified that error appears in the above-identified patent and that said Letters Patent is hereby corrected as shown below:

On the Title page, items,

[73] line 1, AISIN SEIKI KABUSHIKI KAISHA, KARIYA;

[73] line 3, TOYOTA, BOTH OF JAPAN

Signed and Sealed this

Fifteenth Day of June, 1993

Attest:

MICHAEL K. KIRK

Attesting Officer

Acting Commissioner of Patents and Trademarks